Patented Aug. 8, 1944

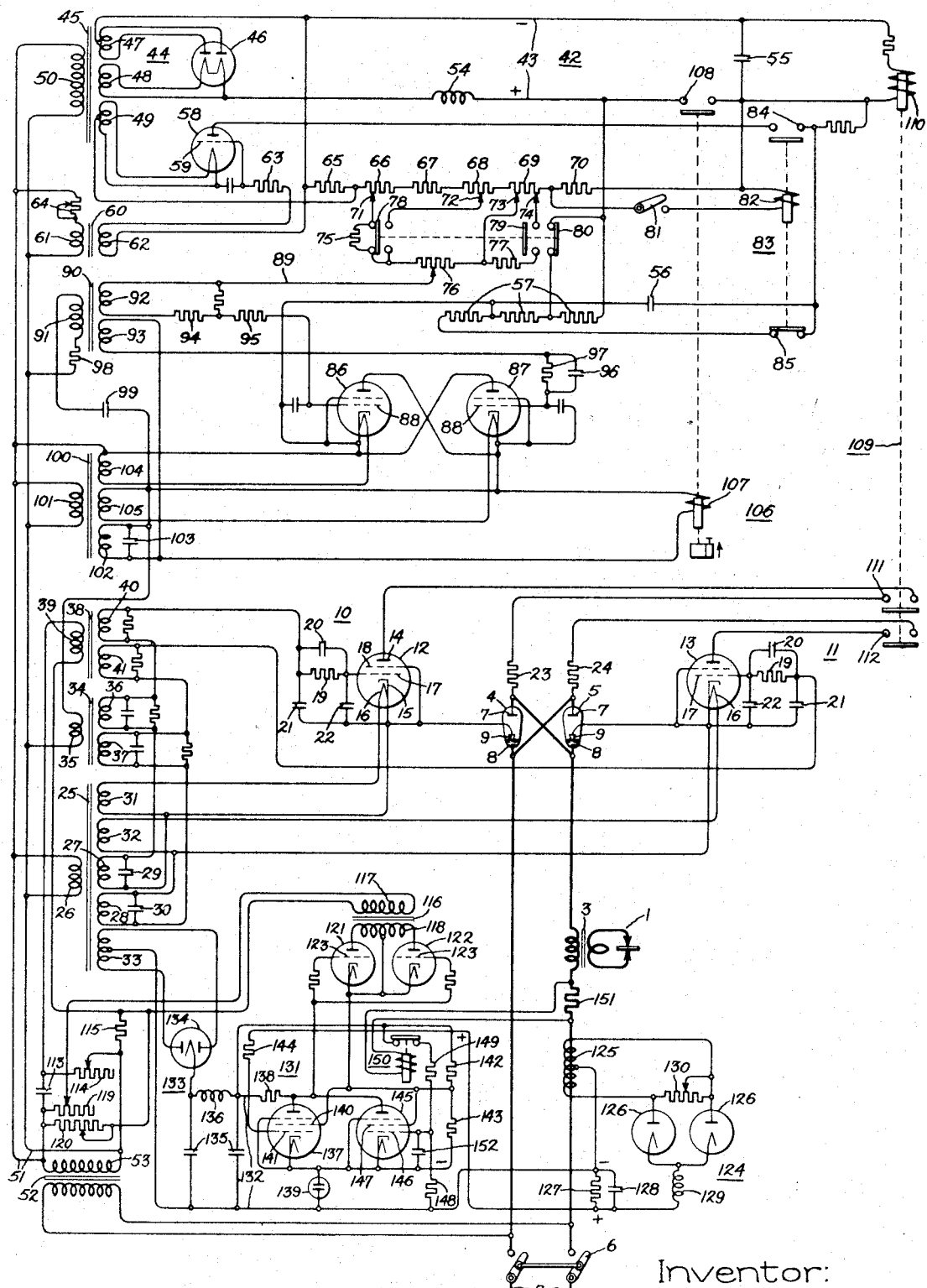

2,355,453

UNITED STATES PATENT OFFICE 2,355,453

ELECTRIC VALVE CIRCUIT

Orrin W. Livingston, Scotia, N. Y., assignor to General Electric Company, a corporation of New York Application December 18, 1941, Serial No. 423,522

12 Claims. (Cl. 171—119)

My invention relates to electric valve translating apparatus, and more particularly to control or regulating circuits for electric valve systems.

Electric valve apparatus offers decided advantages in those applications where it is desired to effect energization of a load circuit, such as a welding circuit, for a predetermined interval of time or for predetermined recurring intervals of time, and where it is desired to effect the transmission of a precise amount of current to the load circuit during such intervals. In accordance with the teachings of my invention discussed hereinafter, I provide a new and improved control or regulating system which is susceptible of controlling the amount of current transmitted to a load circuit in a more precise manner than that afforded by the prior art arrangements.

It is an object of my invention to provide a new and improved electric translating system.

It is another object of my invention to provide a new and improved electric valve control system for electric translating apparatus.

It is a further object of my invention to provide a new and improved control or regulating system for electric valve apparatus wherein an electrical condition, such as the current of the load circuit, is precisely maintained at a definite value.

It is a still further object of my invention to provide a new and improved regulating system for electric translating apparatus which may be operated intermittently to effect energization of the load circuit during predetermined intervals of time.

Briefly stated, in the illustrated embodiment of my invention I provide a new and improved control or regulating system for maintaining an electrical condition, such as the current of a load circuit, precisely at a definite value. The electric translating apparatus is controlled to effect intermittent energization of the load circuit during predetermined intervals of time, and the control or regulating circuit, which is responsive to the load current, controls the conductivity of the electric translating apparatus to maintain the load constant. Means are provided in the control or regulating circuit to control the range of control obtainable and to assure that the load current is maintained at a definite value during each energization including the first half cycle of energization of the load circuit.

In some applications of electric valve converting systems to arrangements for energizing load circuits, such as welding circuits and welding machines, it is necessary to provide a control system or regulator which permits accurate control of the current transmitted to the load circuit and to compensate thereby for variations in impedance or inductance of the load circuit. For example, in many welding machines the inductance of the secondary winding of the power transformer which is connected to the arms of the welding machine is varied due to the adjustability of the welding arms. In accordance with my invention, I provide a regulator which adequately controls the load current irrespective of variations in the inductance of the welding transformer circuit occasioned by the adjustment of the welding machine.

For a better understanding of my invention, reference may be had to the following description taken in connection with the accompanying drawing, and its scope will be pointed out in the appended claims. The single figure of the drawing diagrammatically illustrates an embodiment of my invention as applied to an electric valve translating system for energizing a welding circuit.

Referring now to the single figure of the drawing, I have there illustrated my invention as applied to an electric translating system for energizing a load circuit, such as a welding circuit 1, from an alternating current supply circuit 2 through electric translating apparatus including a transformer 3 and a pair of reversely connected electric valve means 4 and 5. A suitable circuit controlling means or switch 6 may be connected between the supply circuit 2 and the translating apparatus.

The electric valve means 4 and 5 are preferably of the type comprising an ionizable medium, such as a gas or a vapor, and each may comprise an anode 7, a cathode, such as a mercury pool cathode 8, and a control member 9 which may be of the immersion-ignitor type having an extremity thereof extending into the mercury of the associated cathode. The control members 9 are constructed of a material such as boron carbide or silicon carbide.

I provide excitation circuits 10 and 11 which are associated with electric valve means 4 and 5, respectively, and which comprise trigger or control electric discharge devices 12 and 13. These electric discharge devices are also preferably of the type employing an ionizable medium, such as a gas or a vapor, and each may comprise an anode 14, a cathode 15, a cathode heating element 16 and control means. The control means may include a control member 17 and a second control member or shield grid 18 which may be connected to the cathode 15. Excitation circuits 10 and 11 may comprise means for impressing on the grids 17 negative unidirectional biasing potentials and may include self-biasing means, such as a parallel connected resistance 19 and a capacitance 20. Filtering capacitances 21 and 22 may be connected in the excitation circuits 10 and 11 in order to absorb extraneous transient voltages present therein. The electric discharge devices 12 and 13 are arranged to be responsive to the polarity of the anode-cathode voltages of the respective associated main electric valves 4 and 5, and are connected between the anodes 7 and control members 9 thereof through current limiting resistances 23 and 24, respectively.

As a means for impressing hold-off voltages on the control grids 17 of the electric discharge devices 12 and 13, I provide a transformer 25 having a primary winding 26 and secondary windings 27 and 28. Capacitances 29 and 30 may be connected across the secondary windings 27 and 28, respectively. The transformer 25 is also provided with secondary windings 31 and 32 which serve as sources of cathode heating current for the cathode heating elements 16 of electric discharge devices 12 and 13. An auxiliary source of alternating current may be provided by means of a secondary winding 33, the function of which is explained hereinafter.

To superimpose on the biasing or hold-off voltages impressed on control grids 17 of electric discharge devices 12 and 13, voltages to determine the periods of conduction of the electric discharge devices 12 and 13, but which are of a value in themselves insufficient to overcome the effect of the biasing voltages, and which require the presence of additional voltages such as voltages of peaked wave form, described hereinafter, I provide a transformer 34 having a primary winding 35 and secondary windings 36 and 37 which are connected to the grids 17 of electric discharge devices 12 and 13, respectively.

I employ a transformer 38 comprising a primary winding 39 and secondary windings 40 and 41 which impress on the grids 17 of the electric discharge devices 12 and 13, respectively, alternating voltages of peaked wave form which, cooperating with the voltages produced by secondary windings 36 and 37 of transformer 34, render the electric discharge devices 12 and 13, and hence the main or power electric valve means 4 and 5, conducting during predetermined intervals of time such as predetermined numbers of half cycles of voltage of supply circuit 2.

A timing circuit 42 is provided which produces a timing voltage and which accordingly determines the period of conduction of electric valve means 4 and 5, thereby determining the period of energization of the welding circuit 1. The timing voltage is controlled to render the electric valve means 4 and 5 conducting for a predetermined number of half cycles of voltage of the supply circuit 2. The timing circuit 42 comprises a suitable source of direct current 43. This source of direct current may be provided by means of a rectifier 44 which may be of the bi-phase type comprising a transformer 45 and a pair of unidirectional conducting paths provided by a rectifying device 46. Transformer 45 is provided with a winding 47 which is connected to the rectifying device 46, and may also be provided with secondary windings 48 and 49 which serve as sources of cathode heating current. Primary winding 50 of transformer 45 is connected to circuit 51 which is energized from a secondary winding 53 of transformer 52. A suitable filtering inductance 54 and a capacitance 55 may be connected across the direct current source 43.

To produce a timing voltage, I employ a capacitance 56 which is connected to be charged from the direct current source 43 through a portion of a resistance 57 and a control electric valve 58. The control electric valve 58 is preferably of the type employing an ionizable medium and comprises a control grid 59. Electric valve 58 is rendered conducting precisely at a predetermined time during cycles of voltage of circuit 2 or circuit 51 by means of a transformer 60 which may be of the saturable type designed to produce a voltage of peaked wave form. Transformer 60 includes a primary winding 61 and a secondary winding 62 which is connected to grid 59 through a resistance 63. A variable impedance, such as a variable resistance 64, may be connected in series relation with primary winding 61 of transformer 60 in order to control the phase of the output voltage of peaked wave form with respect to the voltage of circuit 51. In order to control the magnitude and the wave shape of the timing voltage produced by circuit 42, I employ a resistance or a plurality of resistances 65—70, inclusive, having a plurality of taps 71—74, inclusive, and which are connected across the source 43. The effective value of resistances 65—70, inclusive, may be controlled by means of resistances 75—77 and by means of associated gang switches 78—80, inclusive.

To initiate operation of the timing circuit 42, I provide an initiating switch 81. Switch 81 is connected in circuit with an actuating coil 82 of relay 83 which is provided with contacts 84 in series relation with the anode-cathode circuit of the control electric valve 58, and is also provided with contacts 85 which close a discharge circuit for the capacitance 56.

As an agency for supplying to the transformer 34, particularly primary winding 35 thereof, a predetermined number of half cycles of current corresponding to the desired period of energization of the welding circuit 1 determined by the timing voltage produced by timing circuit 42, I provide electric valve means such as a pair of coupling or control electric discharge devices 86 and 87. These discharge devices are preferably of the type employing an ionizable medium and each includes a control grid 88. The anode-cathode circuits of the discharge devices 86 and 87 are connected reversely in parallel so that alternating current is transmitted to the primary winding 35 of transformer 34 from circuit 51. The electric discharge devices 86 and 87 may be arranged in a leading and trailing relationship; that is, the electric discharge device 86 may be controlled in response to the timing voltage produced by circuit 42 through conductor 89, and the electric discharge device 87 may be connected to conduct current in response to the conductivity or current conducted by discharge device 86. This control may be obtained by means of a transformer 90 having a primary winding 91 and secondary windings 92 and 93. Secondary winding 92 is connected to impress an alternating component of voltage on grid 88 of discharge device 86 through resistances 94 and 95; and the secondary winding 93 is connected to grid 88 of the discharge device 87 to impress a relatively positive voltage on grid 88 in response to the conductivity of the discharge device 86. A suitable source of self-biasing potential, such as a parallel connected capacitance 96 and a resistance 97, may be connected to the grid 88 of the discharge device 87. A current limiting resistance 98 and a capacitance 99 may be connected in series relation with primary winding 91 of transformer 95. This means serves to prevent the imposition of a substantial lagging current on circuit 51 when the electric discharge devices 86 and 87 are rendered conducting, and also serves to obtain the desired phase displacement between the voltages produced by secondary windings 92 and 93 relative to the voltage of circuit 51.

A transformer 100 having a primary winding 101 and a secondary winding 102 is employed to impress a hold-off voltage on the grid 88 of discharge device 87. Of course, after the discharge device 86 conducts, the voltage produced by winding 93 is sufficient to render the discharge device 87 conductive by overcoming the effect of the voltage produced by a winding 102. A capacitance 103 may be connected across the terminals of winding 102. Windings 104 and 105 of transformer 100 may be used as sources of cathode heating current for discharge devices 86 and 87. The magnitude of the voltage produced by secondary winding 102 is sufficient to maintain the discharge device 87 non-conducting when transformer 90 is not energized. However, when transformer 90 is energized, the voltage produced by secondary winding 93 is sufficient to overcome the effect of the winding 102 and the discharge device 87 is rendered conducting.

I employ protective means, such as time delay apparatus, for preventing operation of the system until the cathodes of the various electric discharge devices have attained safe operating temperatures. For example, I provide a time delay relay 106 having an actuating coil 107 and contacts 108. Actuating coil 107 is connected to be energized from circuit 51 through transformer 100. After a predetermined time delay, contacts 108 are closed. I also provide another protective relay 109 having an actuating coil 110 and contacts 111 and 112 which are connected in the anode-cathode circuits of the control electric discharge devices 12 and 13, respectively. This relay prevents closure of the excitation circuits until after operation of the time delay relay 106.

To control the amount of current transmitted to the load circuit 1 during each period of energization of the welding circuit 1, I provide means exclusively electrical for controlling the phase relationship of the voltages of peaked wave form impressed on grids 17 of electric discharge devices 12 and 13 by means of transformer 38. More specifically, I connect suitable phase shifting means, such as phase shifting means of the static impedance type which may be energized from the secondary winding of transformer 52. The phase shifting circuit may be of the bridge type wherein one branch of the bridge comprises a capacitance 113 and a resistance 114, and in which the other branch of the bridge comprises a resistance 115 and a variable impedance element such as a variable inductance which may comprise a transformer 116 having a winding 117 connected in the bridge circuit and provided with a winding 118 which is controlled to vary the effective inductive reactance of winding 117. A variable resistance 119 may be connected in series relation with the winding 117, if desired. Suitable means, such as an adjustable resistance 120, may be connected across the winding 117, or across winding 117 and resistance 119, to limit the possible range of phase shift of the alternating voltage supplied to transformer 38 and, hence, to limit the phase of the peaked voltages produced by windings 40 and 41 of this transformer.

Resistances 119 and 120 together limit the amount of phase shift produced by maximum and minimum conductivity of valves 121 and 122 and thereby minimize any tendency of the system to hunt while still permitting sufficient range of operation to maintain the load current at a constant value under actual operation.

The effective inductive reactance of winding 117 may be controlled by means such as a pair of electric discharge devices 121 and 122, each being provided with a control grid 123. The discharge devices 121 and 122 are arranged to transmit variable amounts of current through winding 118, thereby controlling the effective inductive reactance of winding 117. I provide means responsive to the current transmitted between the supply circuit 2 and load circuit 1 for controlling the phase position of the voltages of peaked wave form which are impressed on grids 17 of discharge devices 12 and 13, thereby maintaining the current transmitted to welding circuit 1 at a substantially constant value. A rectifier 124 energized from a current transformer 125 and comprising rectifying means such as unidirectional conducting paths 126 produces across a resistance 127 and a capacitance 128 a unidirectional voltage the magnitude of which varies in accordance with the magnitude of the current transmitted between the supply circuit and the welding circuit. A smoothing reactance 129 may be connected in series relation with the output of the conducting paths 126, and a voltage limiting means such as a resistance 130 may be connected across the output terminals of the current transformer 125.

In order to control the potential of the grids 123 of electric discharge devices 121 and 122, I employ a control circuit 131 which is exclusively electrical and which employs no moving parts. The control circuit 131 comprises a source of unidirectional voltage 132 of substantially constant value which may be provided by means of a rectifier 133 including a rectifying device 134 energized from secondary winding 33 of transformer 25. Suitable filtering means including capacitances 135 and smoothing inductance 136 are connected across the output circuit of the rectifier 133. Circuit 131 also includes an electric discharge device 137, the anode-cathode circuit of which is energized from the direct current source 132 through a resistance 138, and a suitable constant voltage device, such as a glow discharge valve 139, which is of the type which maintains across its terminals a substantially constant voltage when maintained in an ionized or conducting condition. Discharge device 137 is provided with one control grid 140 and a second control grid 141. The potential of grid 141 is varied in accordance with the output voltage of rectifier 124, and thereby accurately and precisely controls the amount of current transmitted through resistance 138 to control the potential of grids 123 in response to the current transmitted between the supply circuit and the welding circuit.

The potential of grid 141 varies in response to the voltage appearing across resistance 127. Grid 140 is energized from a voltage divider connected between the positive and negative terminals of the right-hand capacitance 135. This voltage divider comprises resistances 142 and 143. Grid 141 is connected to the positive terminal of resistance 127 through a resistance 144.

I provide current pre-set means, such as an electric discharge device 145 having an anode-cathode circuit connected in parallel with the anode and cathode of discharge device 137 and which controls the voltage impressed on grids 123 during and preceding the initiation of each period of energization of welding circuit 1, thereby limiting the phase displacement between the voltages of peaked wave form impressed on grids 17 of discharge devices 12 and 13 and, consequently, limiting or pre-setting the maximum amount of current which may be transmitted to the welding circuit 1 during such times of initiation. Discharge device 145 includes screen grid 147, which may be energized from the voltage divider, including resistances 142 and 143. Control grid 146 is connected across the resistance 127 through a voltage divider including resistances 148 and 149. Resistances 148 and 149 are proportioned so that when this voltage divider circuit is closed, the voltage impressed on grid 146 is sufficiently positive to maintain the discharge device 145 conductive, thereby maintaining the potential impressed on grids 123 sufficiently negative so that these discharge devices are maintained at a small degree of conductivity or completely biased to cut-off.

While the discharge devices 121 and 122 may be controlled by circuit 131 so that these discharge devices are biased to cut-off, it will be understood that the circuit 131 may be adjusted so that the conductivities of the discharge devices 121 and 122 are varied within such limits as to produce only a minimum disturbance of the system during the initiation of each energization of the load circuit and at the same time provide an adequate control thereof to prevent the transmission of either an excessively large or exceedingly small value of load current at the beginning of each energization of the load circuit.

I provide means, such as current responsive means, for initially biasing the circuit 131 and the excitation system, so that a current in excess of a predetermined maximum current may not be transmitted to welding circuit 1 during the initiation of each period of energization. This biasing means may comprise a relay 150 having an actuating coil which is energized in response to the current transmitted between the supply circuit and the welding circuit. If desired, the actuating coil may be energized from a shunt 151 connected in series relation with the primary winding of transformer 3. Relay 150 is designed to open its contacts as soon as current begins to flow from the supply circuit 2 through the welding transformer 3.

To bias discharge device 145 to cut-off after the contacts of relay 150 are opened, I connect a capacitance 152 in circuit with resistance 148 to impress a negative voltage on the grid 146.

The operation of the embodiment of my invention shown in the single figure of the drawing will be explained by considering the system when it is operating to transmit current to the welding circuit 1 during a predetermined interval of time. Initially, switch 6 is closed. Closure of this switch supplies current to the cathode heating elements of the various electric discharge devices and effects energization of actuating coil 107 of the time delay relay 106. After a predetermined interval of time which permits the cathodes to assume safe operating temperatures, relay 106 closes its contacts 108. The welding operation may then be initiated by closure of switch 81 which energizes coil 82 of relay 83, effecting closure of its contacts 84 and opening of its contacts 85. Operation of relay 83 also closes relay 109.

When contacts 85 of relay 83 are opened, the discharge circuit for capacitance 56 is also opened and a timing impulse or voltage is generated by the charging of capacitance 56 from the source of direct current 43. The duration of this timing impulse, or a predetermined portion thereof, determines the period of energization of the welding circuit 1. The timing voltage which is produced by circuit 42 renders the discharge devices 86 and 87 conducting for a predetermined number of cycles of voltage of the supply circuit. These discharge devices are connected to operate in a leading and trailing relationship and transmit a predetermined number of cycles of alternating voltage to the control grids 17 of the electric discharge devices 12 and 13.

Prior to the application of the alternating voltages to control members 17 by coupling discharge devices 86 and 87, discharge devices 12 and 13 have been maintained non-conducting due to the biasing potentials impressed on these grids by means of secondary windings 27 and 28, respectively, of transformer 25. The voltages impressed on grids 17 of discharge devices 12 and 13 by secondary windings 36 and 37 are not sufficient in magnitude of themselves to overcome the effect of the biasing potentials, but when combined with the voltages of peaked wave form produced by secondary windings 40 and 41 of transformer 38 are sufficient to render the electric discharge devices 12 and 13 conducting for the number of half cycles of conduction established by electric discharge devices 86 and 87. In order to render the discharge devices 12 and 13 conducting, the voltages derived through transformer 34 and the voltages of peaked wave form must appear coincidentally in order to overcome the effect of the biasing voltages.

Upon being rendered conductive, the discharge devices 12 and 13 transmit impulses of current alternately to control members 9 of electric valve means 4 and 5, thereby rendering these electric valve means conducting alternately to transmit alternating current to the welding circuit 1.

The amount of current transmitted to welding circuit 1, that is the effective or R. M. S. value, is determined by the time during the half cycles of voltage of circuit 2 at which the electric valve means 4 and 5 are rendering conducting. As the times at which the electric valve means 4 and 5 are rendered conducting are advanced towards the zero point during the respective positive half cycles of anode-cathode voltage, the effective value of current transmitted to the welding circuit is increased and, conversely, at the times at which the valves are rendered conducting are retarded, the effective value is decreased. In other words, the effective value of current is a function of the angle or phase displacement between the zero value of the respective positive half cycles of anode-cathode voltage and the time during the positive half cycles at which the valves are rendered conducting.

The control circuit 131 and the associated apparatus function to control the phase relationship of the voltages of peaked wave form produced by secondary windings 40 and 41 of transformer 38 relative to the voltage of supply circuit 2, thereby maintaining the load current at a substantially constant value. The effective impedance of winding 117 of transformer 116 is controlled in response to load current, or in response to the current which is transmitted between the supply circuit and the welding circuit to vary the phase of the alternating voltage supplied to primary winding 39 of transformer 38 relative to the voltage of circuit 2, thereby controlling the phase of the voltages of peaked wave form.

Electric discharge devices 121 and 122 control the amount of current which is transmitted through secondary winding 118 and, hence, control the effective impedance of winding 117. The amount of current transmitted by discharge devices 121 and 122 is determined by the potential impressed on grids 123, and this potential varies in response to the output voltage of rectifier 124, or in response to the amount of current transmitted between the supply circuit and the welding circuit.

Considering the operation of the control circuit 131 in detail, electric discharge device 137 transmits variable amounts of unidirectional current through resistance 138, thereby controlling the potential of grids 123. If it be assumed that the load current or the current transmitted to the welding transformer 3 momentarily tends to increase to a value above the desired value, the voltage appearing across resistance 127 correspondingly increases effecting a rise in potential of grid 141 and causing the discharge device 137 to transmit an increased amount of current. Such action lowers the potential of grids 123, effecting a decrease in the amount of current transmitted through winding 118 and consequently increasing the effective impedance of winding 117. The increase of the impedance of winding 117 effects a retardation in phase of the alternating voltage supplied to primary winding 39 of transformer 38, and accordingly retards the phase of the voltages of peaked wave form produced by windings 40 and 41. Because of this retardation in phase, the electric discharge devices 12 and 13 and the electric valve means 4 and 5 are rendered conducting at later times during the respective positive half cycles of applied anode-cathode voltage and, consequently, the effective value of current transmitted to welding circuit 1 is decreased. In this manner, the load current or the welding current is lowered to the predetermined value. Conversely, the system operates to raise the load current to the desired value if the load current tends to decrease to a value below the desired value.

The electric discharge device 145 serves to control the operation of the electric discharge devices 121 and 122 during the initiation of each period of energization of the welding circuit 1. Immediately prior to the application of current to the welding transformer 3, relay 150 is in the deenergized position effectively connecting resistances 148 and 149 in the system. The voltage impressed on grid 146 is sufficiently positive to maintain discharge device 145 partially conducting, and as a result the voltage impressed on grids 123 is maintained at a value so that discharge devices 121 and 122 are pre-set to transmit current of a value slightly below the normal operating point. This action simulates the operation that would be obtained if the current were slightly too large in the welding circuit. Thus the phase control is set below its normal current setting at the start of the welding operation. As soon as the weld is initiated, the normally closed contacts of relay 150 are opened and the grid 146 of discharge device 145 is lowered to a negative value determined by the value of the capacitance 152 and resistance 148. By the proper adjustment of the constants of this circuit, discharge device 145 may be biased to cut-off at approximately the same time the voltage across resistance 127, which represents the current signal, has had time to build up, and the discharge device then proceeds to take over its regulating function to maintain constant current. The circuit 131 establishes a maximum limit of the current transmitted to the welding circuit, or, viewed in another manner, establishes the minimum phase displacement between the resultant voltage impressed on grids 17 of discharge devices 12 and 13 during the starting operation.

The period of energization of the welding circuit 1 is determined by the timing voltage produced by timing circuit 42. When the timing voltage decreases to a magnitude insufficient to render discharge devices 86 and 87 conducting, the period of energization of the load circuit is terminated.

The system may be re-set by opening switch 81 which deenergizes actuating coil 82 of relay 83 and closes the discharge circuit for capacitance 56. Upon subsequent closure of switch 81, a timing voltage is again produced and the above sequence of operation is repeated.

While I have shown and described my invention as applied to particular systems of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, an alternating current supply circuit, a load circuit, electric translating apparatus connected between said circuits and comprising electric valve means having a control member for effecting energization of said load circuit for a predetermined number of half cycles of voltage of said supply circuit, excitation means for impressing on said control member a voltage which is variable in phase with respect to the voltage of said supply circuit, said excitation means comprising a phase shifting circuit including an electric discharge device having a grid, means responsive to the current transmitted between said supply circuit and said load circuit for varying the potential of said grid to maintain said current substantially constant, and means responsive to said current for controlling said discharge device and for limiting the phase displacement of said variable phase voltage with respect to the voltage of said supply circuit.

2. In combination, an alternating current supply circuit, a load circuit, electric translating apparatus connected between said circuits and comprising electric valve means having a control member, excitation means for controlling the energization of said control member to render said electric valve means conducting for a predetermined number of half cycles of voltage of said supply circuit, means for impressing a voltage on said control member to control the current conducted by said valve means, means responsive to the current supplied to said load circuit for varying said voltage over a predetermined range to maintain the current supplied to said load circuit substantially constant, means for energizing said control member with a predetermined voltage within the limits of said range, and means for rendering said last mentioned means effective during periods of deenergization of said load circuit to prevent said means responsive to load current from energizing said control member with a voltage corresponding to the limit of said range at the beginning of periods of energization of said load circuit.

3. In combination, a supply circuit, a load circuit, electric translating apparatus connected between said circuits and comprising electric valve means having a control member, control means for controlling said translating apparatus, means responsive to the current transmitted between said supply circuit and said load circuit for controlling the operation of said control means, preset means for initiating a predetermined energization of said load circuit, and means responsive to the actual flow of current between said supply circuit and said load circuit for preventing operation of said preset means.

4. In combination, an alternating current supply circuit, a load circuit, electric translating apparatus connected between said circuits and comprising electric valve means having a control member, excitation means for controlling the energization of said control member to render said electric valve means conducting for a predetermined number of half cycles of voltage of said supply circuit, means for controlling said excitation means to maintain the current transmitted to said load circuit substantially constant by varying the voltage of said control member over a predetermined range, and means for energizing said control member during periods of deenergization of said load circuit with a predetermined voltage intermediate the limits of said range to prevent said last mentioned means from effecting energization of said control member in accordance with load current during periods of deenergization of said load circuit.

5. In combination, an alternating current supply circuit, a load circuit, electric translating apparatus connected between said circuits and comprising electric valve means having a control member, excitation means for controlling the energization of said control member to render said electric valve means conducting for a predetermined number of half cycles of voltage of said supply circuit, said excitation means comprising means for impressing on said control member a voltage of variable phase relation with respect to the voltage of said supply circuit and comprising an electric discharge device, current responsive means for controlling said discharge device to maintain the current transmitted to said load circuit at a substantially constant value, means for controlling said discharge device to effect energization of said control member in accordance with a predetermined value of current in said load circuit prior to and during the initiation of current flow to said load circuit, and means responsive to the current of said load circuit for rendering said last mentioned means ineffective.

6. In combination, a supply circuit, a load circuit, electric translating apparatus connected between said circuits and comprising electric valve means having a control member, excitation means for controlling the energization of said control member for rendering said electric valve means conducting for a predetermined interval of time, said excitation means comprising means for supplying a control voltage to said control member for controlling the current transmitted to said load circuit, means responsive to the current transmitted between said supply circuit and said load circuit for controlling said last mentioned means, preset means for establishing a predetermined degree of conductivity of said electric valve means, and means responsive to the actual flow of current between said supply circuit and said load circuit for preventing operation of said preset means.

7. In combination, an alternating current supply circuit, a load circuit, electric translating apparatus connected between said circuits and comprising electric valve means having a control member for effecting energization of said load circuit for a predetermined number of half cycles of voltage of said supply circuit, excitation means for impressing on said control member a voltage which is variable in phase with respect to the voltage of said supply circuit, said excitation means comprising a phase shifting circuit including an electric discharge device having a grid, a second electric discharge device for controlling the potential of said grid, means responsive to the current transmitted from said supply circuit to said load circuit for controlling the conductivity of said second discharge device and for controlling the potential of said grid to maintain the load current at a substantially constant value, and means for establishing initially a predetermined maximum conductivity of said electric valve means upon initiation of each period of energization of said load circuit.

8. In combination, an alternating current supply circuit, a load circuit, electric translating apparatus connected between said circuits and comprising electric valve means having a control member for effecting energization of said load circuit for a predetermined number of half cycles of voltage of said supply circuit, excitation means for impressing on said control member a voltage which is variable in phase with respect to the voltage of said supply circuit, said excitation means comprising a phase shifting circuit including an electric discharge device having a grid, means for controlling the potential of said grid in response to the current transmitted between said supply circuit and said load circuit comprising a second electric discharge device having a grid, a third electric discharge device, said second and said third discharge devices being connected in parallel, means responsive to said current for controlling the conductivity of said second discharge device thereby controlling the potential of the grid of the first mentioned discharge device, and means responsive to the current transmitted between said supply circuit and said load circuit for controlling the conductivity of said third discharge device to limit the operation of said phase shifting means.

9. In combination, an alternating current supply circuit, a load circuit, electric translating apparatus connected between said circuits and comprising electric valve means having a control member for effecting energization of said load circuit for a predetermined number of half cycles of voltage of said supply circuit, excitation means for impressing on said control member a voltage which is variable in phase with respect to the voltage of said supply circuit, said excitation means comprising a phase shifting circuit including an electric discharge device having a grid, means responsive to the current transmitted between said supply circuit and said load circuit including a rectifier for producing a unidirectional voltage the magnitude of which varies in accordance with said current, means connected between said grid and said rectifier for controlling the potential of said grid and comprising a second electric discharge device having a grid the potential of which varies in accordance with said unidirectional voltage, a third electric discharge device connected in parallel with said second discharge device and connected to the grid of the first mentioned discharge device, and means responsive to the current transmitted between said supply circuit and said load circuit for limiting the potential impressed on the grid of the first mentioned discharge device during the initiation of each period of energization of said load circuit.

10. In combination, an alternating current supply circuit, a load circuit, electric translating apparatus connected between said circuits and comprising electric valve means having a control member for effecting energization of said load circuit for a predetermined number of half cycles of voltage of said supply circuit, excitation means for impressing on said control member a voltage which is variable in phase with respect to the voltage of said supply circuit, said excitation means comprising a phase shifting circuit including an electric discharge device having a grid, means responsive to the current transmitted between said supply circuit and said load circuit including a rectifier for producing a unidirectional voltage the magnitude of which varies in accordance with said current, means connected between said grid and said rectifier for controlling the potential of said grid and comprising a second electric discharge device having a grid the potential of which varies in accordance with said unidirectional voltage, a third electric discharge device connected in parallel with said second discharge device and connected to the grid of the first mentioned discharge device, and relay means responsive to the current transmitted between said supply circuit and said load circuit for controlling the conductivity of said third discharge device to limit the phase displacement between said variable phase voltage with respect to the voltage of said supply circuit during the initiation of each period of energization of said load circuit.

11. In combination, an alternating current supply circuit, a load circuit, electric translating apparatus connected between said circuits and comprising electric valve means having a control member, an excitation circuit for energizing said control member including means for effecting energization of said load circuit for a predetermined number of half cycles of voltage of said supply circuit, means responsive to load current for varying the voltage of said control member to vary the instant of initiation of conduction of said electric valve means over a predetermined range and thereby to maintain said load current substantially constant, means for establishing an electrical quantity corresponding to a predetermined instant within said range, and means for selectively rendering said last two mentioned means effective during periods of energization and deenergization of said load circuit to limit the amount of phase advance of the instants at which the voltage impressed on said control member exceeds the critical voltage of said valve means during periods of deenergization of said load circuit.

12. In combination, an alternating current supply circuit, a load circuit, electric translating apparatus connected between said circuits and comprising electric valve means having a control member, means for energizing said control member to determine the periods of energization and deenergization of said load circuit, means for energizing said control member to control the instant in the anode-cathode voltage of said electric valve means that said valve means is rendered conductive comprising means responsive to the current transmitted to said load circuit for varying said instant over a predetermined range, means for establishing a predetermined energization of said control member corresponding to an instant of initiation of conduction intermediate the limits of said range, and means for selectively impressing the output of said current responsive means and said electrical quantity on said control member to regulate said valve means in accordance with the load current during periods of energization and in accordance with said electrical quantity prior to each of said periods of energization.

ORRIN W. LIVINGSTON.